(No Model.)
C. C. GILMAN.
MANUFACTURE OF ARTIFICIAL STONE.
No. 566,751. Patented Sept. 1, 1896.
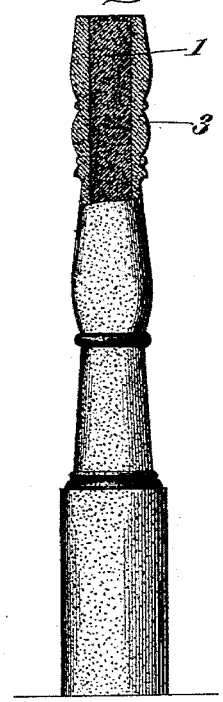
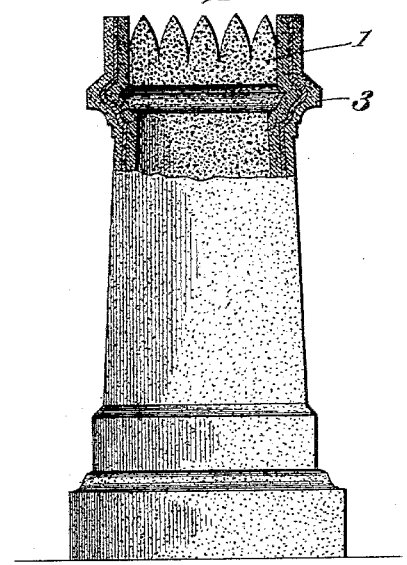
Witnesses
M. Fowler
F. W. Acker
Inventor
Charles C. Gilman
By Joseph L. Atkins
Attorney

UNITED STATES PATENT OFFICE.

CHARLES CARROLL GILMAN, OF ELDORA, IOWA.

MANUFACTURE OF ARTIFICIAL STONE.

SPECIFICATION forming part of Letters Patent No. 566,751, dated September 1, 1896.

Application filed April 12, 1895. Serial No. 545,504. (No specimens.)

*To all whom it may concern:*

Be it known that I, CHARLES CARROLL GILMAN, of Eldora, county of Hardin, State of Iowa, have invented certain new and useful Improvements in the Manufacture of Artificial Stone, of which the following is a specification, reference being had to the accompanying drawings.

The object of my invention is to produce a veneer of artificial stone, whereby the manufacture of such stone is facilitated and the scope of its use materially enlarged. Generally speaking, the art of producing artificial stone consists of compounding a mortar of argillaceous lime and sand with water under such conditions as to chemically convert the mortar to rock. This has been ordinarily accomplished by ramming the plastic mortar into a mold or the like and performing the operation under water or in moist ground, in order to exclude atmospheric interference. In this way rock of great density and weight and of great strength to resist tension and compression strain may be produced, but its employment has been limited by the conditions under which it was possible to produce it in perfection. In addition to the weight of the artificial rock so produced, its shrinkage in manufacture and the consequent difficulty in shaping or forming it have contributed to exclude it from general use for building purposes.

By my invention I propose, first, to eliminate one of the conditions of manufacture heretofore considered imperative, namely, the manufacture of it under water or upon moist earth; secondly, to reduce its weight so that it may be more readily available; thirdly, to shape it by fictile means instead of compression, and, fourthly, to eliminate the injury from shrinkage.

In the accompanying drawings, Figure I is a view of a round post; Fig. II, a view of a square ornament, as, for example, a chimney. Fig. III is a view of a post divided into sections.

In order to carry out my process, I must employ as a base a foundation or core 1 of porous material, such as, for example, the brick-stuff material shown and described in my United States Letters Patent No. 405,028, issued June 11, 1889, though I am not confined to the exclusive use of that particular material. The porosity of the material must be sufficient to enable storage of sufficient water to afford the hydration necessary to the chemical petrifaction of the mortar.

The formula for the manufacture of the core or cement hydrating base is entirely different from that ordinarily followed in brickmaking, and the product is essentially distinct from bricks and the like, in that it is capable of retaining by saturation the large quantity of water necessary to the hydration and consequent petrifaction of the mortar. The formula which I at this time deem preferable is the employment of a considerable quantity of black soil with clays, too fat for brick-making, and commingling asbestos with greater or less quantities of vegetable matter that enter the plastic composition, which, being indestructible by the firing processes, remains in the burned wares as a fiber to bind them as jute does staff, the great porosity of the earthenware being only possible by excessive adulteration of the clays with combustible matter.

By the above formula it is possible to produce sheet stuffs which will not warp in the after processes of drying and burning or shrink or expand under any conditions of heat, cold, or moisture subsequent thereto, and which can be cut by a common hand-saw as easily as soft woods. It is also necessary to compel the evaporation of moisture from the core through the mortar, and not elsewhere. This may be readily accomplished where the core is solid by completely enveloping the outer surface of the core, but where the core is hollow, as, for example, in Fig. II, it should be first roughly lined with a coating of the mortar, or in some instances with gypsum mortar. This lining should be allowed to dry so as to prevent the evaporation of mortar through it and compel the evaporation of moisture through the outer coat of mortar which is to be petrified.

Having prepared the core, either by selection or by lining it where hollow cores are employed, I next thoroughly saturate it with water, the character of the brick-stuff suggested as the material for the core being such as to perfectly contain the water within its pores without dripping. I next apply to the saturated surface of the core a previously-prepared mortar and shape it as required. The shaping process may be accomplished in a variety of ways, either by the fingers or by the use of a small trowel, where irregular or square edges are to be produced, or if the contour of the object is regularly rounded, as, for example, in Fig. I, the core may be revolved between centers, as upon a lathe. These, however, involve matters of detail which will readily suggest themselves to one familiar with cognate arts. A suitable mortar may be prepared by adding to one volume of Portland cement four or more of clean dry sand, screened between Nos. 6 and 12 sieves and tinted according to requirement by ocher, for example. This mixture may be preserved dry and when ready for use may be mixed in a mortar-box with water by working it to the proper consistency or to that stage known to plasterers as "good mortar." In applying the mortar coating 3 the operator must be governed by the size of his core and the amount of moisture it will hold in determining the thickness of the coating. To prevent possible checking from air-drafts, the completed article may be covered with a moist protector, as, for example, wet woolen cloths, which may be kept moist until the veneer is entirely seasoned, the time required for such seasoning being a week or more, depending upon atmospheric conditions, though complete petrifaction does not ensue for months after. Broadside work in like manner may be safely performed without necessity of dividing into small squares, as is done on ground surfaces to prevent cracking and peeling; but tight joints must be made between brick-stuff subcovering by sawing their edges. No mortar gobbing between joints is allowed.

What I claim is—

1. The process of producing rock-veneers, which consists in storing a sufficient quantity of water within a porous brick-stuff core by saturation, protecting a portion of the surface of the porous brick-stuff core from evaporation of its contents and finally coating the unprotected surface of the saturated core with a hydraulic mortar or cement, whereby the hydration of the hydraulic cement or mortar is rendered complete by the water stored within the core without the necessity for surface wetting, substantially as specified.

2. The process of producing ornamental rock-veneers, which consists in storing a sufficient quantity of water within a porous brick-stuff core by saturation, protecting a portion of the surface of the porous brick-stuff core from evaporation of its contents, coating the unprotected surface of the saturated core with a hydraulic mortar or cement, whereby the hydration of the hydraulic cement or mortar is rendered complete by the water stored within the core without the necessity for surface wetting, and finally ornamenting the hydraulic cement or coating while in the plastic state, substantially as specified.

3. The process of producing rock-veneers, which consists in storing a sufficient quantity of water within a porous brick-stuff core by saturation, protecting a portion of the surface of the brick-stuff core from evaporation of these contents, coating the unprotected surface of the saturated core with a hydraulic mortar or cement, whereby the hydration of the hydraulic cement or mortar is rendered complete by the water stored within the core without the necessity for surface wetting, and finally protecting the article from the air during the hydration of the hydraulic cement, substantially as specified.

4. A building material consisting of a base of light porous earthenware capable of containing sufficient water to hydrate a rock-face veneer, said light porous earthenware being partially covered by a rock-face veneer of hydraulic cement-mortar, and having its unveneered surface completely covered with a rough lining of the cement sufficient only to prevent the evaporation of the water from the porous earthenware during the manufacture of the material, but not sufficient to consume an appreciable amount of the water designed to hydrate the rock-face veneer, substantially as specified.

In testimony of all which I have hereunto subscribed my name.

CHARLES CARROLL GILMAN.

Witnesses:
A. B. UNDERWOOD,
GILBERT JOHNSON.